United States Patent
Heid et al.

(10) Patent No.: US 6,543,960 B1
(45) Date of Patent: Apr. 8, 2003

(54) CAMMING COUPLER FOR A MUSIC DESK

(75) Inventors: Barry T. Heid, Yakima, WA (US); Peter J. Abercrombie, Selah, WA (US)

(73) Assignee: Manhasset Specialty Co., Yakima, WA (US)

( * ) Notice: Subject to any disclaimer, the term of this patent is extended or adjusted under 35 U.S.C. 154(b) by 0 days.

(21) Appl. No.: 09/602,751

(22) Filed: Jun. 23, 2000

(51) Int. Cl.⁷ .................................................. F16B 7/10
(52) U.S. Cl. .................... 403/359; 403/109.1; 403/367; 403/377; 248/441.1
(58) Field of Search .............................. 403/350, 351, 403/352, 367, 366, 110, 109.5, 109.1, 377, 104, DIG. 8; 248/441.1, 460, 447, 448, 188.5, 188.6, 188.7, 167

(56) References Cited

U.S. PATENT DOCUMENTS

| | | | |
|---|---|---|---|
| 1,554,538 A | 9/1925 | Walberg | 45/121 |
| 2,538,318 A | 1/1951 | Mitchell | 120/28 |
| 2,952,485 A | 9/1960 | Hammond | 287/58 |
| 3,215,482 A | 11/1965 | Litke | 312/233 |
| 3,637,172 A | 1/1972 | Diesbach | 248/460 |
| 4,524,484 A * | 6/1985 | Graham | 403/104 X |
| 4,585,367 A * | 4/1986 | Gall | 403/104 |
| 4,606,525 A | 8/1986 | Lombardi | 248/460 |
| 4,761,092 A | 8/1988 | Nakatani | 403/104 |
| 4,819,902 A | 4/1989 | Wenger et al. | 248/460 |
| 4,948,149 A * | 8/1990 | Lin et al. | 403/104 X |
| 5,037,057 A | 8/1991 | Andrews | 248/460 |
| 5,106,048 A | 4/1992 | Lebar et al. | 248/460 |
| 5,114,111 A | 5/1992 | Andrews | 248/460 |
| 5,417,511 A * | 5/1995 | Warden | 403/109.5 |
| 5,564,661 A | 10/1996 | Gershon | 248/167 |
| 5,636,824 A | 6/1997 | Biasini | 248/441.1 |
| 5,692,719 A | 12/1997 | Shepherd | 248/460 |
| 5,791,624 A | 8/1998 | Fedrick | 248/460 |
| 5,833,199 A | 11/1998 | Benting et al. | 248/441.1 |
| 5,871,185 A | 2/1999 | Phillips et al. | 248/167 |
| 5,931,598 A * | 8/1999 | Wang | 403/351 |
| 5,979,857 A | 11/1999 | Holm | 248/451 |
| 6,113,586 A * | 9/2000 | Ouchi | 403/350 X |

FOREIGN PATENT DOCUMENTS

| | | | |
|---|---|---|---|
| GB | 11661 | 5/1896 | 248/462 |

* cited by examiner

Primary Examiner—Lynne H. Browne
Assistant Examiner—John R. Cottingham
(74) Attorney, Agent, or Firm—Stratton Ballew PLLC (57) ABSTRACT

A camming coupler for removably attaching a music desk to an upright support of a music stand is disclosed. The camming coupler includes an inner sleeve for receiving the upright support. The inner sleeve has at least one longitudinal slit formed therein, and preferably has four substantially equidistant longitudinal slits. The inner sleeve also has a cammed exterior surface. An attachment member extends from the inner sleeve, and is pivotally attachable to the music desk. The camming coupler further includes an outer sleeve positioned over the inner sleeve. The outer sleeve has a cammed interior surface that corresponds with the cammed exterior surface of the inner sleeve. In use, the camming coupler is secured to a music desk. The upright support of a music stand is then inserted in the inner sleeve, and the outer sleeve is rotated to compress the inner sleeve.

5 Claims, 10 Drawing Sheets

CAMMING COUPLER FOR A MUSIC DESK

TECHNICAL FIELD

The invention relates to the field of music stands. More particularly, the invention relates toga releasable coupler for securing a music desk to the upright support of a music stand.

BACKGROUND OF THE INVENTION

Most conventional music stands include a base, a shaft, and a desk. The base rests on the ground and holds the shaft in a vertical position. The desk is attachable to the shaft. In most conventional music stands, the desk is permanently attached. However, in some circumstances it is desirable to releasably attach the desk so that it can be removed from the shaft for transport and storage.

Several U.S. patents have provided devices for releasably attaching a music desk to its shaft. For example, U.S. Pat. No. 5,692,719 to Shepherd discloses a collapsible music stand. The music desk of Shepherd is seated on the shaft, and can be removed for transport and storage. U.S. Pat. No. 5,564,661 to Gershon discloses an attachment mechanism for a music desk that includes an arcuate notched coupling head attached to the shaft of the music stand. A spring loaded notched arm attached to the music desk locks the position of the music desk with respect to the shaft. When the arm is disengaged, the music desk can be removed from the coupling head. U.S. Pat. No. 5,636,824 to Biasini discloses a device for attaching the music desk to the shaft. The device includes a lever which can be rotated to compress a sleeve positioned on the shaft. Biasini also discloses a lever having an eccentric portion. When rotated, the lever applies pressure to the shaft of the music stand, thus securing the music desk to the shaft.

A need still exists, however for a music desk attachment device which is simple and inexpensive to manufacture, is durable, and is also effective and easy to use.

Additionally, a need exists for an aesthetically pleasing attachment device for securing a music desk to a music stand. A music stand in use by a musician is frequently in full view of an audience, and thus must be attractive and simple in design to avoid being visually distracting.

Furthermore, a need exists for a music desk attachment device which minimizes damage to the shaft.

SUMMARY OF INVENTION

The invention includes a camming coupler for removably attaching a music desk to a shaft. The camming coupler includes an inner sleeve for receiving the shaft. The inner sleeve has at least one longitudinal slit formed therein, and preferably has four substantially equidistant longitudinal slits. The inner sleeve also has a cammed exterior surface. An attachment member extends from the inner sleeve, and is pivotally attachable to the music desk. The camming coupler further includes an outer sleeve positioned over the inner sleeve. The outer sleeve has a cammed interior surface that corresponds with the cammed exterior surface of the inner sleeve.

In an embodiment of the invention, the inner sleeve has a lip at its distal end for retaining the outer sleeve in position over the inner sleeve. The camming coupler may also include a textured exterior surface on the outer sleeve.

The camming coupler of the present invention is used by inserting the shaft into the inner sleeve, then rotating the outer sleeve to compress the inner sleeve.

The camming coupler of the present invention provides a music desk attachment device which is simple and inexpensive to manufacture, is durable, and is also effective and easy to use. The camming coupler of the present invention additionally provides an aesthetically pleasing attachment device for securing a music desk to a music stand.

Furthermore, the camming coupler of the present invention provides a music desk attachment device which grips the entire circumference of the shaft in order to provide evenly distributed pressure on the shaft and minimize damage to the shaft.

These and other features and advantages are more fully set forth in the drawings and description which follow.

DETAILED DESCRIPTION OF SPECIFIC EMBODIMENTS

Figure 1A:
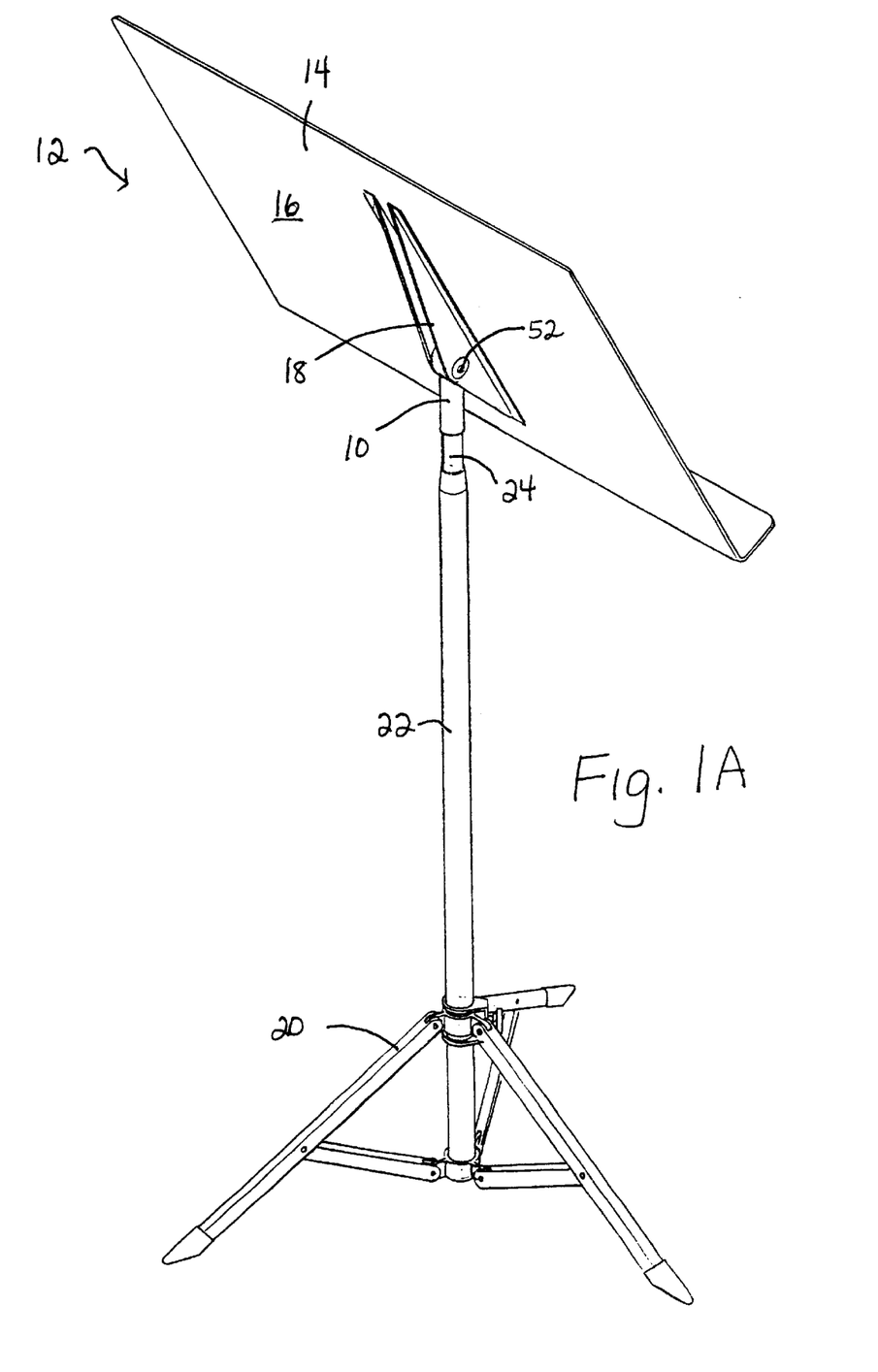
FIG. 1A is a perspective view of a music stand incorporating an embodiment of the camming coupler of the present invention.
Figure 1B:
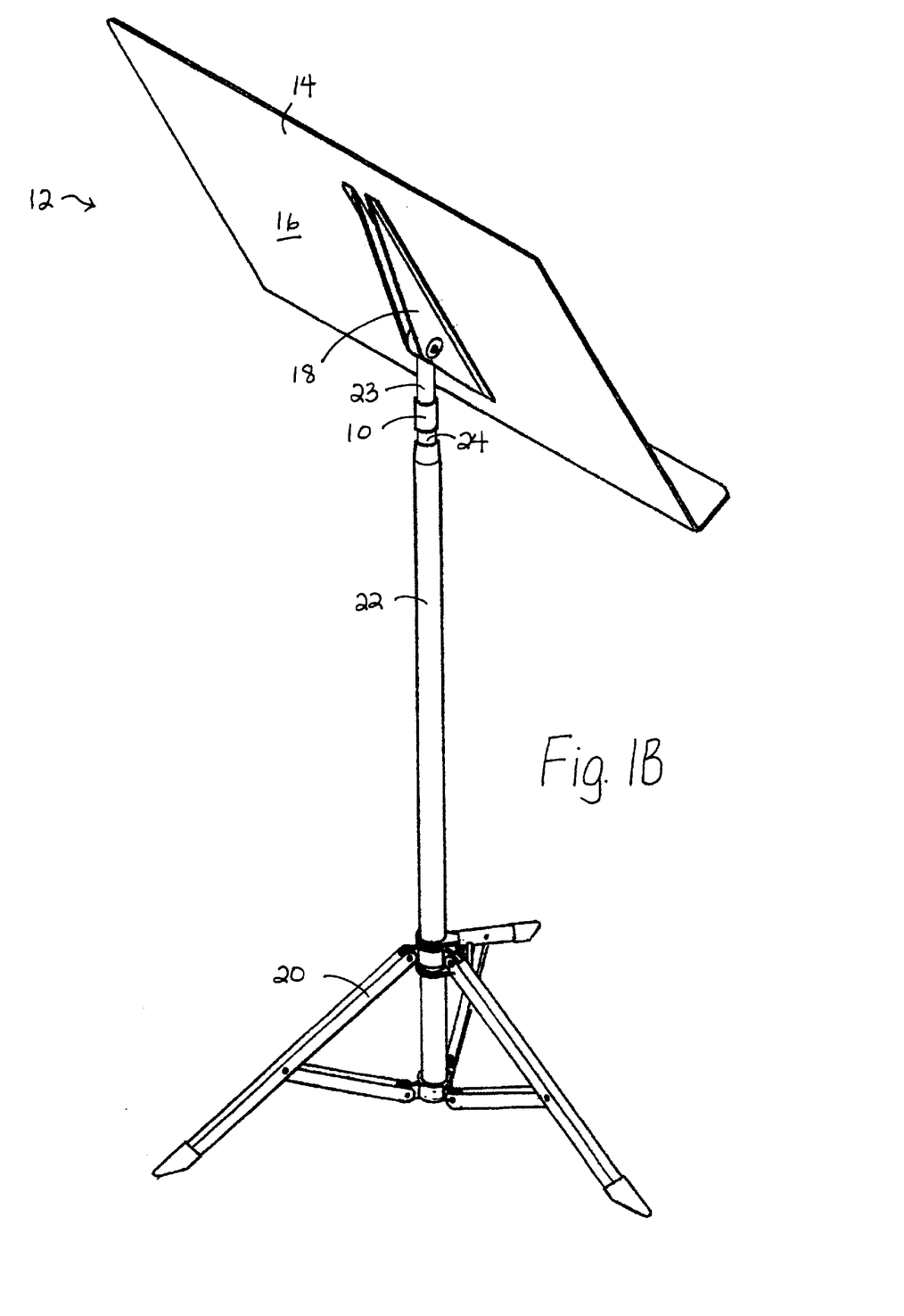
FIG. 1B is a perspective view of a music stand incorporating an additional embodiment of the camming coupler of the present invention.
Figure 2A:
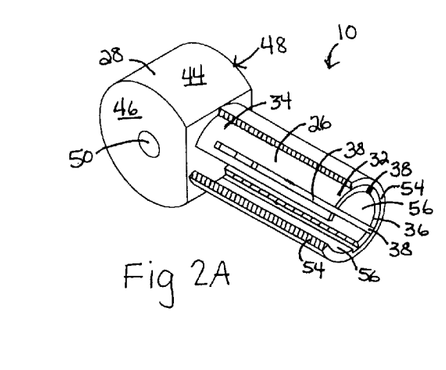
FIG. 2A is a cut away perspective view of a preferred embodiment of the camming coupler of the present invention.
Figure 2B:
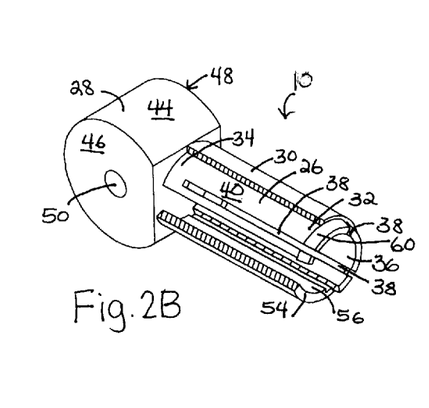
FIG. 2B is a cut away, perspective view of a preferred embodiment of the camming coupler of the present invention.
Figure 3A:
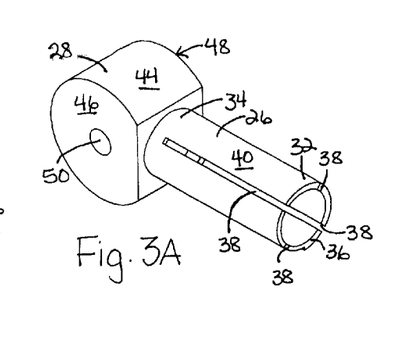
FIG. 3A is a partial perspective view of a preferred embodiment of the camming coupler of the present invention.
Figure 3B:
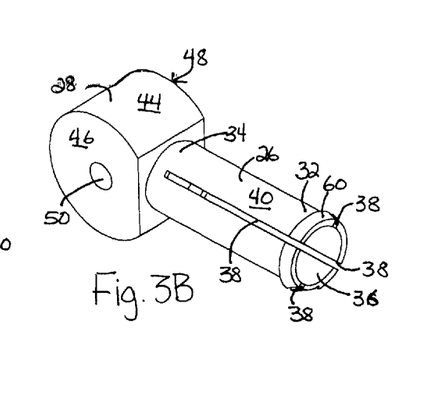
FIG. 3B is a partial perspective view of a preferred embodiment of the camming coupler of the present invention.
Figure 4A:
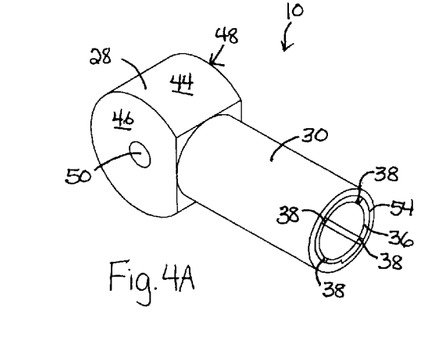
FIG. 4A is a perspective view of a preferred embodiment of the camming coupler of the present invention.
Figure 4B:
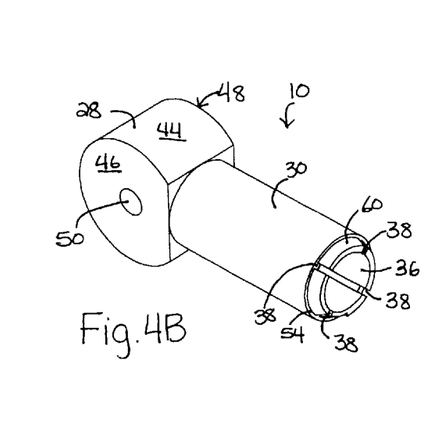
FIG. 4B is a perspective view of a preferred embodiment of the camming coupler of the present invention.
Figure 5A:
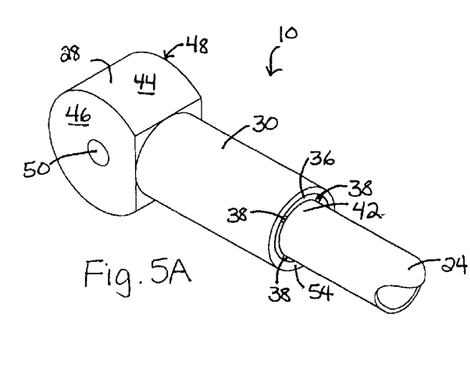
FIG. 5A is a perspective view of a preferred embodiment of the camming coupler of the present invention.
Figure 5B:
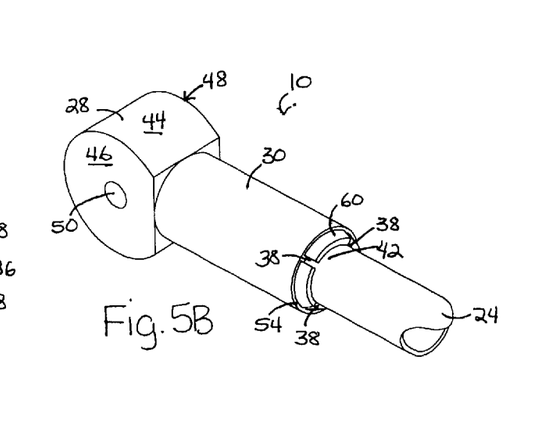
FIG. 5B is a perspective view of a preferred embodiment of the camming coupler of the present invention.

The camming coupler 10 of the present invention is illustrated in the accompanying figures. FIGS. 1A and 1B show the camming coupler in use on a music stand 12 of an otherwise conventional design. The music stand includes a music desk 14 having a surface 16. A bracket 18 is secured to the surface of the music desk. The music stand further includes a base 20, and an upright support 22 extending substantially vertically from the base. The upright support is typically a stationary shaft, and usually includes a telescoping shaft 24 received therein, as shown in FIGS. 1A and 1B. The music stand described and shown is representative of a conventional music stand. The camming coupler of the present invention may be used with any music stand having these basic features.

Figure 14:
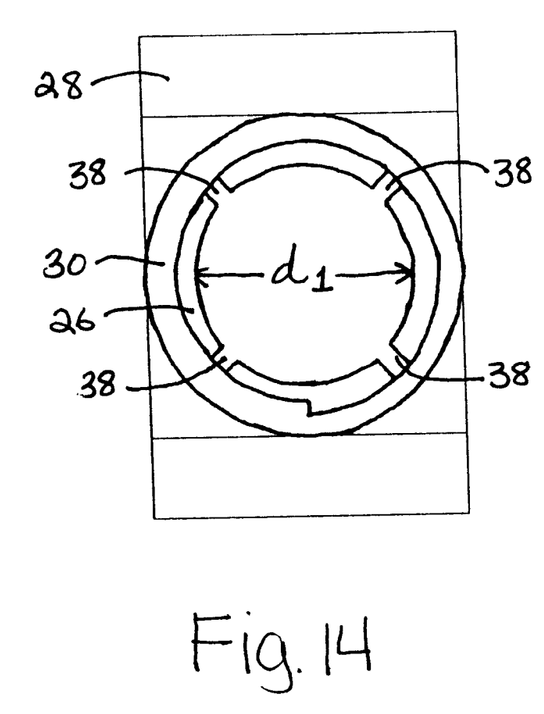
FIG. 14 is an end view of a preferred embodiment of the camming coupler of the present invention.

The camming coupler 10 includes an inner sleeve 26, an attachment member 28 extending from the inner sleeve, and an outer sleeve 30, and is detailed in FIGS. 2A through 9C. The inner sleeve 26 of the camming coupler is hollow and substantially cylindrical in shape, and has a distal end 32 and a proximal end 34, as shown in FIGS. 7A, 7B, 7C, 7D, 8A, 8B, 8C and 8D. The inner sleeve includes an inner sleeve wall 36 and has an uncompressed internal diameter $d_1$, as shown in FIGS. 7C, 8C and 14. The internal diameter of the inner sleeve can be reduced slightly by compressing the inner sleeve. Preferably, this is made possible by providing at least one longitudinal slit 38 in the inner sleeve wall, extending from the distal end of the inner sleeve toward the proximal end. More preferably, a plurality of slits is provided, and in a most preferred embodiment, the inner sleeve includes four substantially equidistant longitudinal slits, as shown in the drawings. The inner sleeve wall increases in thickness around the outer circumference of the wall to form a cammed exterior surface 40, as best seen in FIG. 7C. The inner sleeve is sized to receive an upper end 42 of the telescoping shaft 24 of the music stand 12.

The attachment member 28 of the camming coupler 10 extends from and is affixed to the inner sleeve 26, as shown in FIGS. 2A through 8D. Preferably, the attachment member and the inner sleeve form a single contiguous unit. The attachment member provides a means for pivotally securing the inner sleeve to the music desk. Preferably, the attachment member is secured to the bracket 18 of the music desk 14. In the embodiment shown in the drawings, the attachment member has a rounded outer surface 44 and flat side surfaces 46 and 48 to allow pivotal movement of the attachment member and inner sleeve. Alternatively, the attachment member may have any shape or configuration which can be pivotally secured to the music desk bracket. Preferably, a bolt hole 50 is provided through the attachment member for receiving an attachment bolt 52. Other attachment devices, such as pins, screws, rivets and the like are also contemplated.

Figure 6:
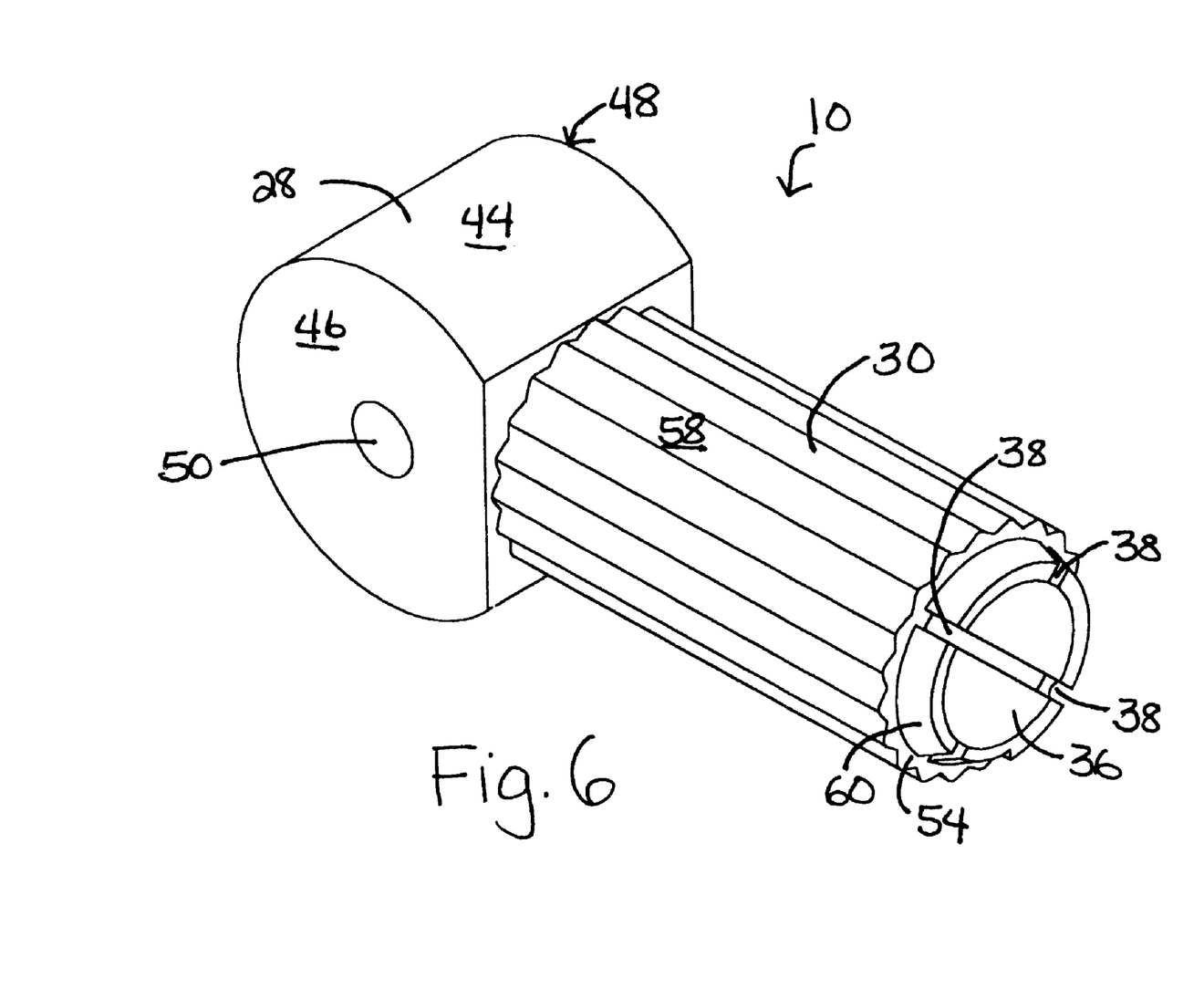
FIG. 6 is a perspective view of a preferred embodiment of the camming coupler of the present invention.
Figure 9A:
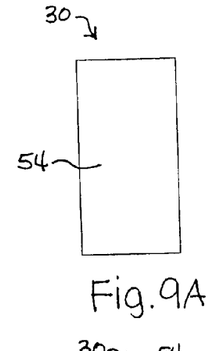
FIG. 9A is a side view of the outer sleeve of a preferred embodiment of the camming coupler of the present invention.
Figure 9B:
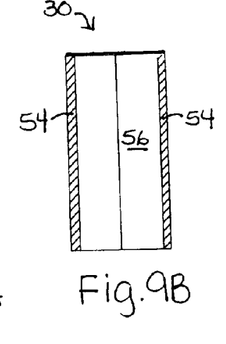
FIG. 9B is a section view of the outer sleeve of a preferred embodiment of the camming coupler of the present invention.
Figure 9C:
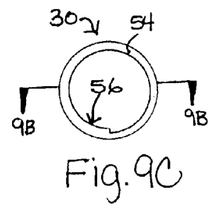
FIG. 9C is an end view of the outer sleeve of a preferred embodiment of the camming coupler of the present invention.
Figure 10:
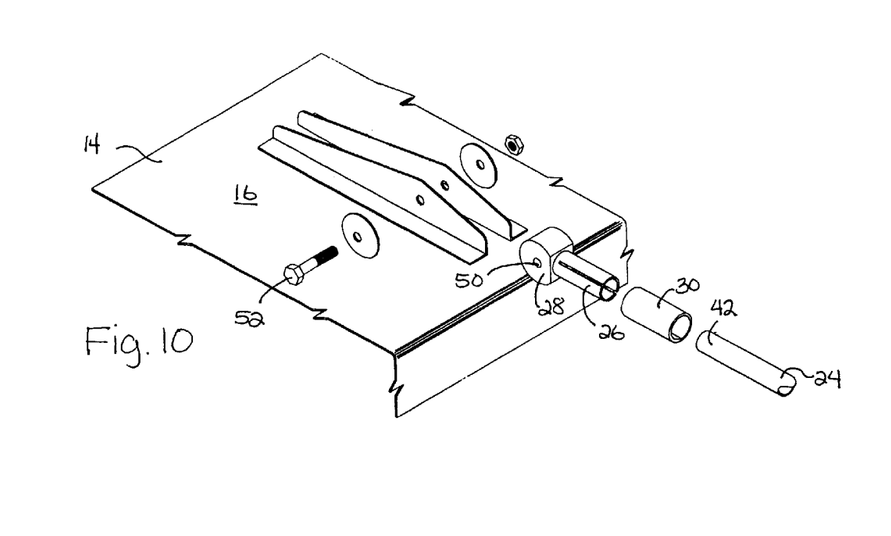
FIG. 10 is an exploded partial perspective view of a music stand incorporating a preferred embodiment of the camming coupler of the present invention.
Figure 11:
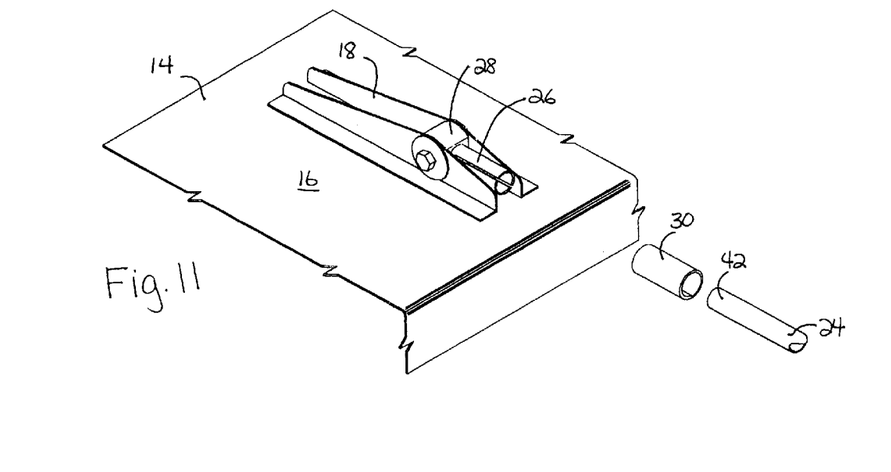
FIG. 11 is an exploded partial perspective view of a music stand incorporating a preferred embodiment of the camming coupler of the present invention.

The outer sleeve 30 of the camming coupler is detailed in FIGS. 9A through 9C. The outer sleeve is hollow and preferably substantially cylindrical in shape, and includes an outer sleeve wall 54. The outer sleeve wall increases in thickness around the inner circumference of the outer sleeve to form a cammed interior surface 56, as best seen in FIG. 9C. In an embodiment, the outer sleeve includes a textured exterior surface 58 as shown in FIG. 6. Any surface texture or coating which improves the gripping surface of the outer sleeve may be employed, and is considered part of the invention.

The outer sleeve 30 of the camming coupler 10 is sized to be received over the inner sleeve 26, as shown in FIGS. 2A, 2B, 4A, 4B, 5A, 5B, 6, 12 and 13. The cammed exterior surface 40 of the inner sleeve corresponds to the cammed interior surface 56 of the outer sleeve. In an embodiment, the inner sleeve has a lip 60 on the distal end 32 for retaining the outer sleeve in position over the inner sleeve. Preferably, the lip is chamfered, as shown in FIGS. 2B, 3B, 4B, 5B, 6, 8A, 8B, 8C and 8D.

The camming coupler 10 of the present invention is described and shown as being secured to a music desk 14, for releasable attachment to an upright support 22 of a music stand 12. It will be appreciated, however, that it is within the scope of the invention to secure the camming coupler to the upright support of the music stand for releasable attachment to an attachment shaft 23 provided on the music desk, as shown in FIG. 1B.

In use, the camming coupler 10 of the present invention provides a means for removably attaching a music desk 14 to the upright support 22 of a music stand 12. The inner sleeve 26 is pivotally secured to the music desk, preferably by passing an attachment bolt 52 or other suitable securing device through holes in the bracket 18 attached to the surface 16 of the music desk, and through the bolt hole 50 of the attachment member 28 extending from the inner sleeve, as shown in FIGS. 10, 11, 12 and 13. The attachment bolt is secured in place with a nut, cap or other suitable device.

Figure 12:
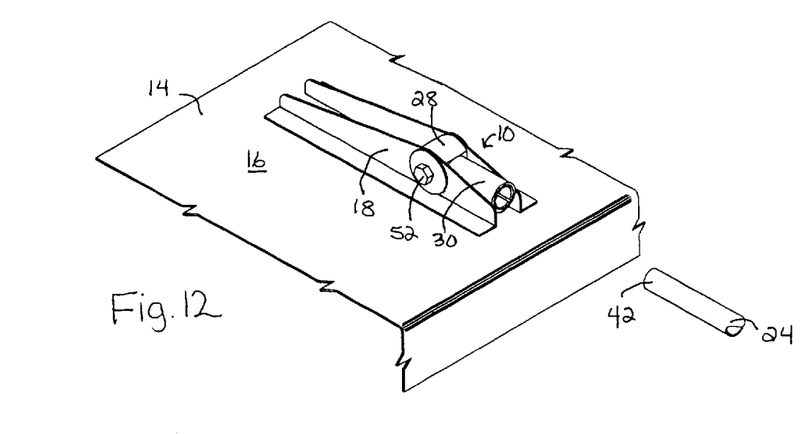
FIG. 12 is a partial perspective view of a music stand incorporating a preferred embodiment of the camming coupler of the present invention.
Figure 13:
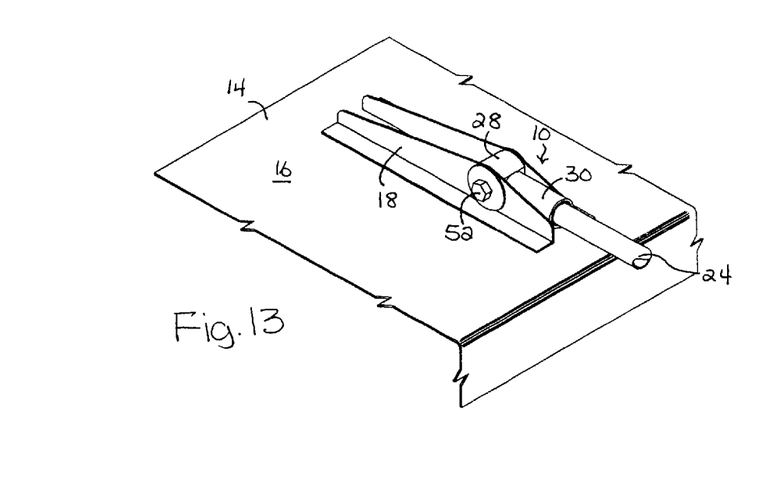
FIG. 13 a partial perspective view of a music stand incorporating a preferred embodiment of the camming coupler of the present invention.

The outer sleeve 30 of the camming coupler is then positioned over the inner sleeve 26, as shown in FIG. 12. In an embodiment, the lip 60 retains the outer sleeve 30 in position over the inner sleeve 26.

Figure 7A:
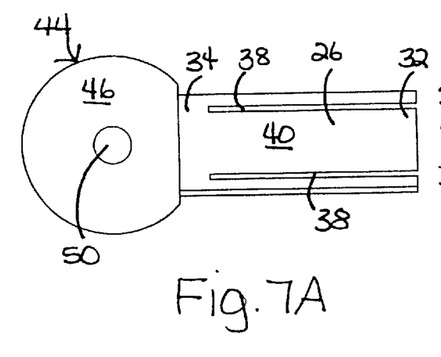
FIG. 7A is a side view of the inner sleeve and attachment member of a preferred embodiment of the camming coupler of the present invention.
Figure 7B:
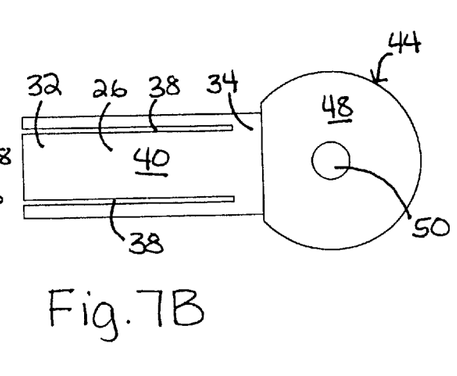
FIG. 7B is a side view of the inner sleeve and attachment member of a preferred embodiment of the camming coupler of the present invention.
Figure 7C:
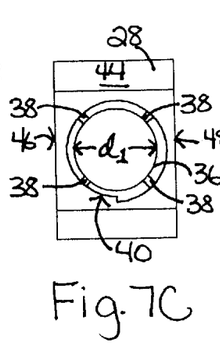
FIG. 7C is an end view of the inner sleeve and attachment member of a preferred embodiment of the camming coupler of the present invention.
Figure 7D:
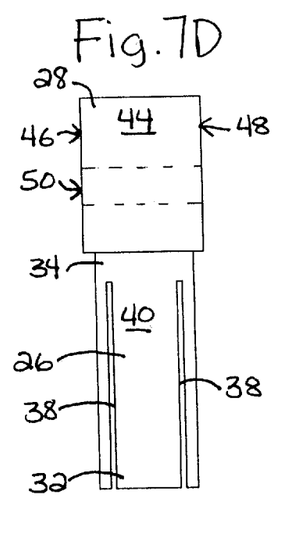
FIG. 7D is a side view of the inner sleeve and attachment member of a preferred embodiment of the camming coupler of the present invention.
Figures 8A, 8C:
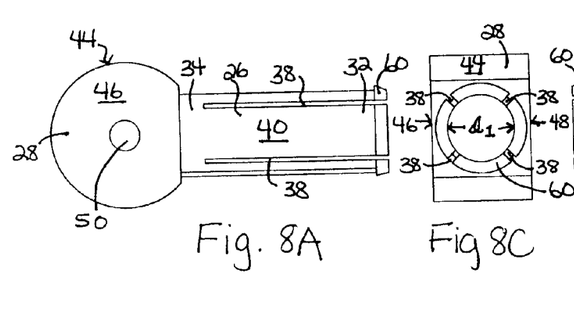
FIG. 8A is a side view of the inner sleeve and attachment member of a preferred embodiment of the camming coupler of the present invention.
FIG. 8C is an end view of the inner sleeve and attachment member of a preferred embodiment of the camming coupler of the present invention.
Figure 8B:
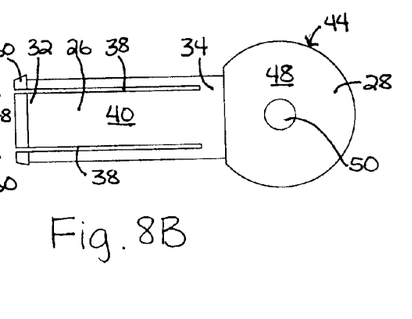
FIG. 8B is a side view of the inner sleeve and attachment member of a preferred embodiment of the camming coupler of the present invention.
Figure 8D:
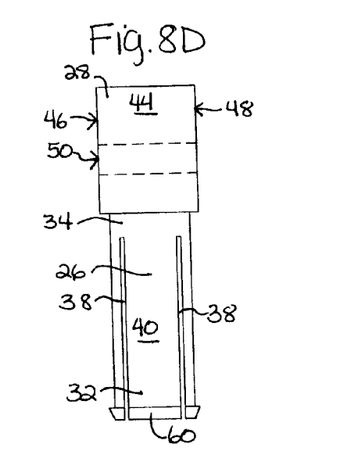
FIG. 8D is a side view of the inner sleeve and attachment member of a preferred embodiment of the camming coupler of the present invention.

In order to secure the camming coupler 10 to the upper end 42 of the telescoping shaft 24 of the music stand, the inner sleeve 26 and the outer sleeve 30 must first be aligned, as shown in FIG. 14. The inner sleeve and the outer sleeve must be in nesting alignment, so that the cammed outer surface 40 of the inner sleeve corresponds with the cammed inner surface 56 of the outer sleeve. When the inner sleeve and the outer sleeve are in nesting alignment, the inner sleeve is in an uncompressed state, and has an uncompressed inner diameter of $d_1$, as shown in FIGS. 7C, 8C and 14. In the uncompressed state, the inner sleeve can receive the upper end of the telescoping shaft.

Figure 15:
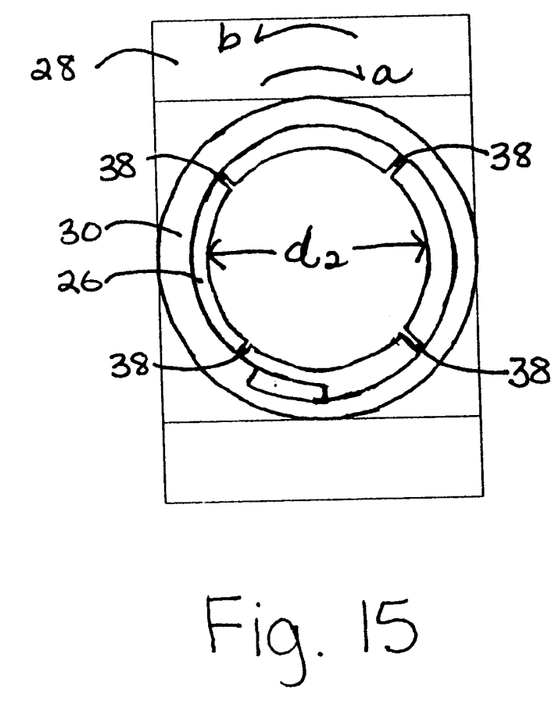
FIG. 15 is an end view of a preferred embodiment of the camming coupler of the present invention.

The upper end 42 of the telescoping shaft 24 is inserted in the inner sleeve 26, and secured in position by rotating the outer sleeve 30 with respect to the inner sleeve, as indicated by directional arrow a in FIG. 15. The rotation of the outer sleeve moves the cammed inner surface 56 out of alignment with the cammed outer surface of the inner sleeve. The outer sleeve thus compresses the inner sleeve, to form a compressed internal diameter $d_2$ of the inner sleeve, as shown in FIG. 15. The compressed diameter $d_2$ is less than the uncompressed diameter $d_1$. In its compressed state, the inner sleeve clamps onto the upper end of the telescoping shaft, thus securely holding the music desk 14 in position on the telescoping shaft.

The action of securing the music desk 14 to the telescoping shaft 24 with the camming coupler 10 is performed rapidly and easily by a user. Likewise, the removal of the music desk from the telescoping shaft, for transport and storage, is easy and fast. The user simply rotates the outer sleeve 30 of the camming coupler, as indicated by the directional arrow b in FIG. 15, to return the inner sleeve 26 to an uncompressed state, and to return the outer sleeve to the position of nesting alignment shown in FIG. 14. The inner sleeve will no longer clamp the upper end of the telescoping shaft, and the music desk can be lifted off the telescoping shaft for transport and storage.

In compliance with the statutes, the invention has been described in language more or less specific as to structural features and process steps. While this invention can be embodied in different forms, the specification describes and illustrates preferred embodiments of the invention. It will be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims, as appropriately interpreted in accordance with the doctrine of equivalents.

What is claimed is:

1. A music stand, the music stand including;
    a base;
    an upright support extending substantially vertically from the base;
    a music desk; and
    a camming coupler for releasably securing the music desk to the upright support of the music stand, the camming coupler including:
        an inner sleeve for receiving the upright support, the inner sleeve having at least one longitudinal slit formed therein, and the inner sleeve having a cammed exterior surface;
        an attachment member extending from the inner sleeve, the attachment member pivotally attachable to the music desk; and
        the inner sleeve receivable within an outer sleeve, the outer sleeve having a cammed interior surface which corresponds with the cammed exterior surface of the inner sleeve.

2. The music stand of claim 1, wherein the inner sleeve has a distal end, and the inner sleeve further includes a lip at the distal end for retaining the outer sleeve in position over the inner sleeve.

3. The music stand of claim 1, wherein the outer sleeve further includes a textured exterior surface.

4. The music stand of claim 1, wherein the inner sleeve includes four substantially equidistant longitudinal slits.

5. A method for releasably securing a music desk to an upright support of a music stand, the method including the steps of:
    fastening a camming coupler to the music desk, the camming coupler including a compressible inner sleeve having a cammed exterior surface and at least one longitudinal slit; an attachment member extending from the inner sleeve, and an outer sleeve positioned over the inner sleeve, the outer sleeve having a cammed interior surface which corresponds with the cammed exterior surface of the inner sleeve;
    aligning the inner sleeve and the outer sleeve so that the inner sleeve is in an uncompressed state;
    inserting the upper end of the upright support of the music stand into the inner sleeve; and
    rotating the outer sleeve of the camming coupler to compress the inner sleeve.

\* \* \* \* \*